United States Patent
Ardila et al.

(10) Patent No.: US 7,599,766 B2
(45) Date of Patent: Oct. 6, 2009

(54) METHOD FOR PROVIDING TERRAIN ALERTS AND DISPLAY UTILIZING TEMPERATURE COMPENSATED AND GPS ALTITUDE DATA

(75) Inventors: Ricardo Ardila, Kenmore, WA (US); Dean L. Farnham, Redmond, WA (US); Nick Feng, Issaquah, WA (US); Robert Scott Ferguson, Redmond, WA (US); Patrick Gerald Krohn, Bellevue, WA (US); Steven J. Moss, Everett, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 725 days.

(21) Appl. No.: 11/221,716

(22) Filed: Sep. 9, 2005

(65) Prior Publication Data

US 2006/0247828 A1    Nov. 2, 2006

Related U.S. Application Data

(60) Provisional application No. 60/610,606, filed on Sep. 17, 2004.

(51) Int. Cl.
*G06F 17/00* (2006.01)

(52) U.S. Cl. .................................. 701/3; 701/4; 701/18
(58) Field of Classification Search .................... 701/3, 701/4, 9, 10, 14, 15, 16; 340/945, 948; 244/158 R, 244/75 R
See application file for complete search history.

(56) References Cited

U.S. PATENT DOCUMENTS

| 6,496,760 | B1 * | 12/2002 | Michaelson et al. | 701/3 |
| 6,745,115 | B1 * | 6/2004 | Chen et al. | 701/9 |
| 7,010,398 | B2 * | 3/2006 | Wilkins et al. | 701/3 |

\* cited by examiner

*Primary Examiner*—Richard M. Camby
(74) *Attorney, Agent, or Firm*—Quarles & Brady; George E. Haas

(57) ABSTRACT

A method of accounting for errors in the altitude reporting of a terrain alert and warning system (TAWS) is disclosed wherein errors due to non-standard atmospheric conditions, incorrect altimeter setting and air data computer (ADC) sensor error are detected and corrected for by compensating ADC altitudes for cold temperatures as well as using global positioning system (GPS) altitude data to confirm the accuracy of the ADC altitude information at all times.

15 Claims, 14 Drawing Sheets

| ADC ALTITUDE BAND IN FEET | GPS ALTITUDE AND TEMPERATURE COMPENSATION AVAILABLE | GPS ALTITUDE UNAVAILABLE TEMPERATURE COMPENSATION AVAILABLE | GPS ALTITUDE AVAILABLE TEMPERATURE COMPENSATION UNAVAILABLE | GPS ALTITUDE AND TEMPERATURE COMPENSATION UNAVAILABLE |
|---|---|---|---|---|
| ADC ALT > 36000 | A/P ALT = GPS ALT -2.5*SIGMA | A/P ALT = ADC ALT | A/P ALT = GPS ALT -2.5*SIGMA | A/P ALT = ADC ALT |
| 0 < ADC ALT < 36000 | IF SAT < ISA<br>　IF TC ADC ALT IS INSIDE<br>　[GPS ALT -2.5*SIGMA]<br>　　A/P ALT = TC ADC ALT<br>　ELSE<br>　　A/P ALT = GPS ALT - 2.5*SIGMA<br>　END IF<br>ELSE ———— SAT >= ISA<br>　IF ADC ALT IS INSIDE [GPS ALT-2.5*SIGMA, GPS ALT+2.5*SIGMA]<br>　　A/P ALT=ADC ALT<br>　ELSE<br>　　A/P ALT=GPS ALT-2.5*SIGMA<br>　END IF<br>END IF | IS SAT<ISA<br>　A/P ALT = TC ADC ALT<br>ELSE<br>　A/P ALT = ADC ALT<br>END IF | IF ADC ALT IS INSIDE<br>[GPS ALT-2.5*SIGMA, GPS ALT+2.5*SIGMA]<br>　A/P ALT=ADC ALT<br>ELSE<br>　A/P ALT=GPS ALT-2.5*SIGMA<br>END IF<br>() | A/P ALT = ADC ALT<br><br>() |

FIG. 13

METHOD FOR PROVIDING TERRAIN ALERTS AND DISPLAY UTILIZING TEMPERATURE COMPENSATED AND GPS ALTITUDE DATA

This application claims the benefit of Provisional Application Ser. No. 60/610,606 filed Sep. 17, 2004.1

FIELD OF THE INVENTION

The present invention relates to the field of avionics. More specifically, this invention relates to a method for providing accurate terrain alerts and warnings utilizing flight plan information.

BACKGROUND OF THE INVENTION

Current aircraft avionics systems including Terrain Alert and Warning Systems (TAWS) accept flight plan information and use this information in the piloting of aircraft. Flight plan information is provided as a series of waypoints having attributes including latitude, longitude, altitude constraints and waypoint identifiers. A flight plan defined by this information is modeled by the system, and the flight plan model is checked against terrain information to locate any instances in which a potentially unsafe flight altitude exists. In flight, the flight path model is updated using aircraft position so that the path from the aircraft position to the next waypoint is reflected in the model. In the event that a potentially unsafe flight altitude is detected, an alert may be issued to the flight crew who can then take appropriate action.

In order to provide accurate terrain alerting, current avionics systems depend on accurate altimeter settings and altitude sensing by a barometric altimeter or Air Data Computer (ADC) for example. Conventional systems do not take into account errors arising from incorrectly set altimeters, ADC sensor errors or errors due to non standard atmospheric conditions (on cold days). Barometric altimeters are calibrated to indicate true altitude under International Standard Atmosphere (ISA) conditions. Any deviation from ISA conditions may result in an erroneous reading on the altimeter. It is routine to set the altimeter for the local pressure when an aircraft is below the transition level but seldom do flight crews consider the effect of cold temperatures on en-route altitude indication. The local altimeter setting provides the necessary correction for the non-standard pressure in the local area but it does not correct for the effect of non-standard temperatures for altitudes above field elevations. The pilot must make the altitude corrections if the temperature source of the altimeter setting is 0° C. (Celsius) or below.

When the temperature is higher than ISA conditions, the true altitude will be higher than the indicated altitude. On the other hand, when the temperature is lower than ISA conditions, the true altitude is lower than the indicated altitude. The altimeter error is relatively minor down to 0° C. but it can be significant with the minimum altitudes required on some approaches to airports in mountainous areas. Moreover, in the context of TAWS, altimeter error due to temperature can cause false alarms or no alarm when one is needed. An illustration of error due to an incorrect altimeter setting is illustrated in FIGS. 1 and 2.

FIG. 1 depicts a flight profile 20 from a conventional TAWS on a standard day with the aircraft altimeter correctly set. As depicted therein, aircraft or ownship position 22 is depicted consistent with the indicated altimeter altitude (i.e., global positioning system (GPS) scale and Barometric scale). In addition, flight plan 24 from a Flight Management System (FMS) is consistent with FMS vertical constraints (Barometric scale). The ownship position 22 in reference to the FMS flight plan 24 is consistent with vertical deviation indicated on a primary flight display (PFD) of the aircraft (not shown). Terrain 26 is depicted on a scale consistent with terrain database altitudes and ownship position 22 and flight plan 24 are depicted accurately in reference to the terrain 26. Referring now to FIG. 2, depicted therein is a flight profile 30 from a conventional TAWS wherein the altimeter has been set in error 250 feet above the correct setting. TAWS depicts the ownship position 32 at 4250 feet (consistent with the altimeter), and continues to depict the FMS flight plan 34 consistent with the vertical waypoint constraint altitudes. However the separation between the ownship position 32 and the terrain 36 is incorrectly depicted as 250 feet greater than actual.

An illustration of error due to a non-standard, cold temperature day is illustrated by FIGS. 1 and 3. As explained above, FIG. 1 depicts the flight profile 20 from a conventional TAWS on a standard day. As is shown therein, ownship position 22 is depicted consistent with FMS waypoint vertical constraints (barometric) and ownship position 22 in reference to FMS flight plan 24 is consistent with the vertical division indicated on the PFD. The terrain 26 is depicted on a scale consistent with terrain database altitudes and ownship position 22 and flight plan 24 are depicted accurately in reference to terrain. In contrast, FIG. 3 depicts a flight profile 40 from a conventional TAWS system on a non-standard day. As is immediately evident, the flight profile 44 is different as compared to the profile 24 in FIG. 3. In particular, the ownship position 42 and flight plan 44 are not depicted accurately in reference to the terrain 46. This figure depicts the case where the non-standard condition (cold temperature) results in the aircraft's true altitude being 250 feet lower than the indicated altitude. The TAWS depicts the ownship position 42 at 4000 feet (consistent with the altimeter), and continues to depict the FMS flight plan 44 consistent with the vertical waypoint constraint altitudes. However, the separation between the ownship position 42 and terrain 46 is incorrectly depicted as 250 feet greater than the actual separation.

In FIG. 3, if the aircraft is controlled along the flight path 44, the 250 feet error would persist, resulting in a hazardously misleading depiction of the separation between the ownship position 42 and flight plan 44 in reference to the terrain 46. The ownship position 43 associated with the dashed line flight plan 45 represents the actual separation that exists due to non-standard atmospheric conditions.

It is desirable therefore to have an avionics device that takes into account altimeter errors due to sensor error, incorrectly set altimeters and non-standard atmospheric conditions.

SUMMARY OF THE INVENTION

The present invention is directed to an avionics system comprising a method that accounts for altitude reporting errors due to ADC sensor errors, incorrectly set altimeters or non-standard atmospheric conditions and provides accurate alerting despite the errors. The present invention provides an accurate depiction of terrain relative to an aircraft even in cases where an incorrect altimeter setting, sensor error and non-standard atmospheric conditions exist. The present invention accomplishes this objective by employing a method that:

1. Determines the aircraft's corrected altitude;
2. Determines a coordinate system transformation between corrected and uncorrected altitude scales; and 3. Applies the coordinate system transformation to barometric altitude data to facilitate the correct determination of Flight Plan Intent Alerts and provide an accurate graphical depiction of the features associated with the barometric data such as the flight plan. Thus, in the present invention a system is provided that provides real-time depiction of the actual separation between ownship position and terrain, regardless of actual (non standard) atmospheric conditions, or incorrect altimeter settings.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 13 indicates airplane altitude settings; and

DETAILED DESCRIPTION OF THE PREFERRED EMBODIMENT

Figure 1:
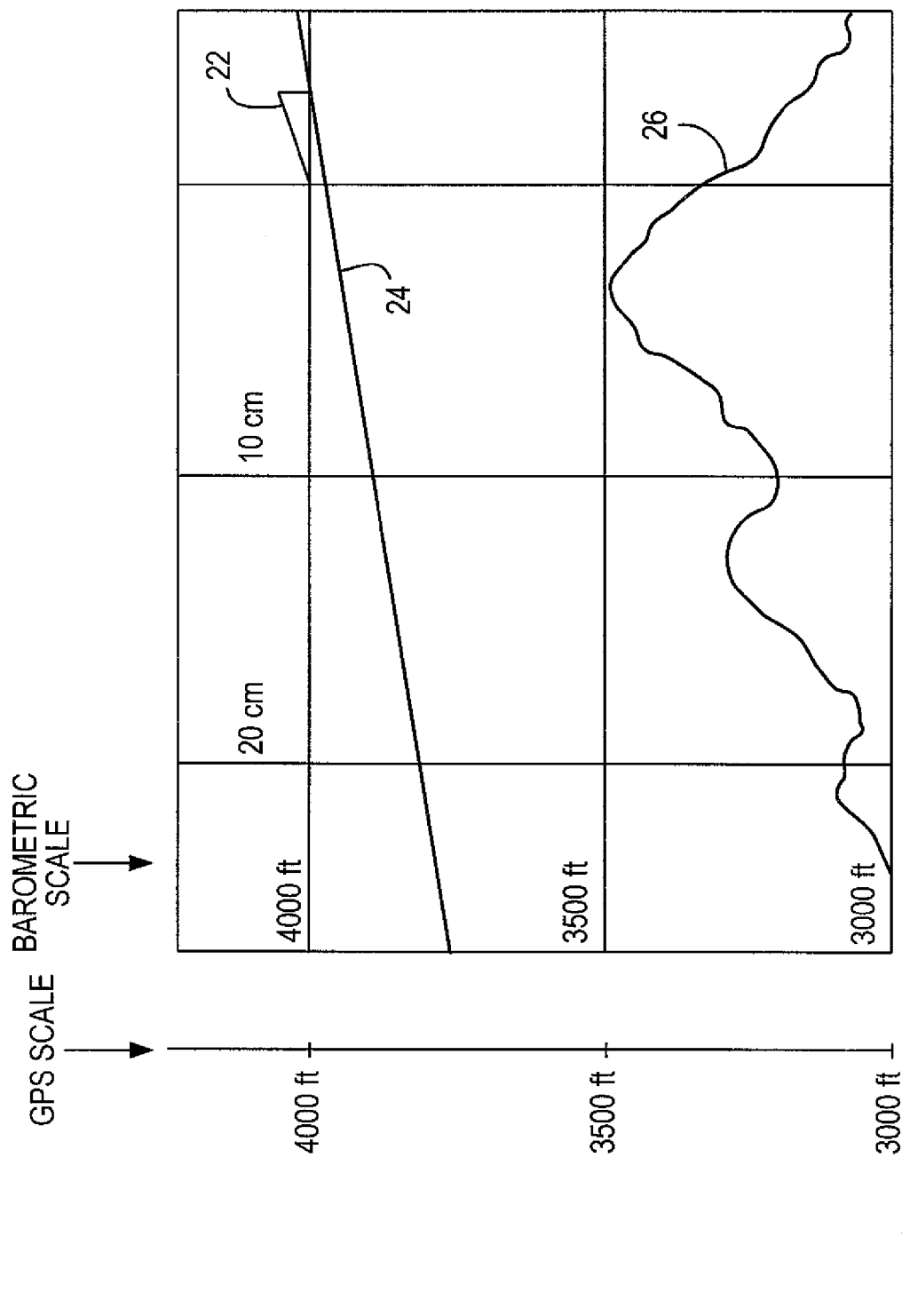
FIG. 1 depicts a flight profile from a conventional avionics system across terrain on a standard day with correct altimeter setting.

Reference will now be made in detail to the preferred embodiments of the present invention, examples of which are illustrated in the accompanying drawings.

The present invention comprises improvements to conventional avionics systems including a TAWS disclosed in commonly assigned U.S. Pat. No. 6,643,580 entitled Flight Plan Intent Alert System and Method, which specification is hereby incorporated by reference. The present invention provides a method for overcoming altitude reporting errors in an avionics system that arise from incorrect altimeter setting, Air Data Computer (ADC) sensor error or altimeter error due to non-standard atmospheric conditions such as deviations from International Standard Atmosphere (ISA) conditions. When ISA conditions are not present, the altitude reading from an altimeter or ADC may not be accurate. In ISA+ conditions (temperature above ISA), an aircraft is higher than the reading on the altimeter. Conversely, in ISA− conditions (temperature below ISA), an aircraft is lower than the reading on the altimeter. The same results can occur if an altimeter is set erroneously. When an avionics system utilizes erroneous altitude information resulting from one of the scenarios described above, spurious alerts can occur and a warning may be absent when an aircraft is in actual proximity to terrain.

The present invention overcomes these problems by employing the following method:

1. Determining the aircraft's corrected altitude;

2. Determining a coordinate system transformation between corrected and uncorrecte altitude scales; and 3. Applying the coordinate system transformation to barometric altitude data such as flight plan waypoint altitudes.

Determination of Corrected Altitude

In a preferred embodiment, the present invention uses two algorithms to compensate ADC altitudes when the air temperature is below standard day values: 1) the enroute method and 2) the field method.

The enroute method is used when ADC altitude is at or above 12,000 ft relies on measurement of static air temperature (SAT). It corrects altitude by an amount proportional to 1) the altitude above mean sea level and 2) the difference between SAT and the standard temperature at the given altitude. The field method is used when ADC altitude is below 12,000 ft. estimates the temperature at the airfield. It corrects altitude by an amount proportional to 1) height above airfield and 2) the difference between the estimated and standard values of airfield temperature.

If the enroute method were used during a cold weather approach to a field that is not at sea level, the corrected altitude could be below the airfield altitude. It should be noted that the enroute method does not take into account that the barometer is set to the arrival field. However, the field method considers this and computes a correction that becomes zero at the airfield and is limited to ADC altitudes below 12,000 ft.

Enroute Method of Temperature Compensation (Used at or Above 12000 Ft.)

The variation of the properties of the atmosphere with altitude is determined by assuming that air is a perfect gas and by postulating the variation of temperature with altitude. The pressure variation with altitude is obtained from the forces acting on an infinitesimal volume of air.

$$(p+dp)A + p\, g\, A\, dh - p\, A = 0$$

where p is pressure, dp is the pressure variation due to the altitude variation dh, p is the air density, g is the acceleration due to gravity, and A dh is the volume of the element.

$$dp = -\rho\, g\, dh$$

This is the hydrostatic equation. Using the perfect gas relationship to eliminate the density yields.

$$dp/p = -(M g/R\, T) dh$$

where M is the mean molar mass of air ($28.9644 \times 10^{-3}$ kg/mol), T is the absolute temperature, and R is the universal gas constant.

The 1962 U.S. standard atmosphere assumes that there is a constant temperature lapse rate of $0.0035662°$ F./ft between sea level and 36,089 feet. This region is called the troposphere. Above it is a region of constant temperature called the tropopause that extends to about 65,000 feet. These two regions cover the flight regime of most aircraft. The 1962 U.S. Standard Atmosphere defines the sea level values of pressure, temperature, and density as $P_o = 2116.22$ lb/sq ft
$T_o = 618.67$ Rankines or 59 Fahrenheit or 15 Celsius
$\rho_o = 0.0223769$ slub/cu ft Using the standard lapse rate, the variation of temperature with altitude is therefore $T = T_o - 0.0035662$ (° F./ft) h (ft)
$DT = -0.0035662\, dh$ Above 36,089 feet the temperature is 389.97 Rankines, or −69.7 Fahrenheit, or −56.5 Celsius.

Below 36,089 feet the variation of pressure with altitude can be determined as follows:

$$dp/p = -(g\, M/R\, T) dh = -(g\, M\, ?R\, T) dT/-0.0035662)$$
$$= 5.25585\, (dT/T)$$

Integrating this between the limits $[p_o, p]$ and $[T_o, T]$ yields ln $(p/p_o) = 5.25585$ ln $9T/T_o)$, or $$p/p_0 = (T/T_0)^{**}5.25585 = ((T_o\text{-lapse\_rate}*h)/T_o)^{**}5.25585$$

Thus, for a given altitude (h) the temperature (T) can be determined, which yields $(T/T_0)$ and finally $(p/p_0)$. The density can be obtained from the perfect gas relationship or as a function of temperature as shown below.

$$\rho/\rho_{0 = (p\, T)/(p0\, T\, 0) = (T/T0)^{**}5.25585}$$

$$\rho/\rho_0 = (T/T_0)^{**}4.25585$$

In the tropopause, the pressure variation with altitude is obtained from the force balance equation:

$$dp/p = -(g/R\, T_{36,089}) dh$$

ln $(p/p_{36,089}) = -(h-36,089) g/(R\, T_{36,089})$ $$p/p_{36,089} = e^{**}\{-(h-36,089) g/(R\, T_{36,089})\}$$

where $p_{36,089}$ and $T_{36,089}$ refer to the pressure and absolute temperature at 36,089 feet. From the perfect gas equation it can be seen that above 36,089 feet the density variation is the same as the pressure variation.

$$\rho/\rho_{36,089} = e^{**}\{-(h-36,089) g/(R\, T_{36,089})\}$$

The relationships given above can be used to define the pressure ration ($\delta = p/p_0$) and density ration ($\sigma = \rho - \rho_0$) in terms of altitude (h) and temperature ratio ($\Theta = T/T_0$) as shown below:

| Below 36,089 feet | Above 36,089 feet |
|---|---|
| $\Theta = 1 - 0.000006875\, h$ | $\Theta = 0.7519$ |
| $\delta = \Theta^{} 5.25585$ | $\delta = 0.223359 e^{} \{ -(h - 36,089)/20,805.7\}$ |
| $\sigma = \Theta^{} 4.25585$ | $\sigma = 0.29707 e^{} \{ -(h - 36,089)/20,805.7\}$ |

The above equations are valid for a standard day only. A natural extension of the standard atmosphere is the "non-standard day". Non-standard days are defined as having the same value of sea level pressure as_a standard day and a constant temperature increment above or below the standard day temperature at every pressure (standard) altitude. For example, an ISA+10 Celsius day defines an atmosphere with a sea level pressure of 2116.22 lb/sq ft, a seal level temperature of 25 Celsius, and a temperature of −46.5 Celsius at a pressure altitude of 36,089 ft. The perfect gas equation can be sued to determine the density at each pressure altitude.

Pressure Altitude is defined as the altitude corresponding to a given pressure on a standard day. Since the aircraft instruments use pressure to determine altitude and since lift and drag are proportional to the ambient pressure, most performance date is given at pressure levels rather than at geometric heights.

Note that the equations of motion determine the flight path in terms of geometric altitude and that the force parameters (lift, drag, thrust) are functions of pressure altitude. Therefore, on non-standard days, care must be exercised in performing flight path computations. the following equations can be used to convert between pressure and geometric altitude increments on non-standard days.

The hydrostatic equation is valid for geometric altitude increments on non-standard days:

$$dp/p = -(g\, M/R\, T) dh_{geom},$$

Since the relative pressure variation during standard and non-standard days is the same, $$dp/p = -(g\, M/R\, T_{STANDARD}) dh_{pres},$$

Therefore, $$dh_{GEOM} = (T/T_{STANDARD}) DH_{PRES}$$

In a standard day the geometric altitude change equals the pressure altitude change. The relationship can be rewritten as $$dh\, GEOM = (T/T_{STANDARD}) DH\text{pres} = \{(T\text{standard} + \Delta T)/T_{STANDARD}\} dh_{pres}$$

$$dh\, GEOM = \{1 + \Delta T/T_o\text{-lapse\_rate}*h_{PRES})\}; dh_{pres}$$

Where $\Delta T$ is the temperature difference from the standard day, $T-T_{STANDARD}$, at the pressure altitude. Integrating the above equation yields $$h_{GEOM} = h_{PRES} - (\Delta T/\text{lapse\_rate})\, \ln\, \{(T_o - \text{lapse\_rate}*h\text{pres})/T_o\}$$

The altitude correction is the product of two terms. The first ($\Delta T$/lapse_rate) is the altitude change corresponding to the temperature difference. The second is a scaling factor that increases with pressure altitude. At sea level, the scaling factor is zero. The higher the pressure altitude, the larger the scaling factor.

At pressure altitudes below 36,089 feet the geometric altitude can also be expressed as $$h\text{GEOM} = h\text{PRES} - (\Delta T/0.0019812)\, \ln\, \{(273.15 + 15 - 0.0019812 * h_{PRES}/288.15\}$$

where $\Delta T$ is in Celsius and altitudes are in feet.

At pressure altitudes above 36,089 feet the geometric altitude is given by $$hGEOM = hPRES [1+(.T/216.65)] - 22.626 \cdot T$$

Note that at temperatures above ISA the geometric altitude is higher than the pressure (standard)altitude. At temperatures below ISA, the geometric altitude is lower than the pressure altitude. For example, a pressure of 15 inches Hg is equivalent to 17,905 ft of standard altitude, but 19,894 ft at ISA +30 Celsius, and 15,916 ft at ISA −30 Celsius.

When the Enroute method is selected, the system of the present invention compensates ADC altitude in the troposphere at least every 100 msec as follows:

1. Obtain ADC altitude in feet (see ADC Altitude section) and static air temperature (SAT) in ° C.
2. Compute Standard Atmosphere temperature at given ADC altitude, in ° C.

Note: The standard temperature gradient below the troposphere is 0.0065° C./meter or 0.0019812° C./Ft. Standard temperature at sea level is 15° C. or 288.15 Kelvins.

T_standard(° C.)=15.0(° C.)−0.0019812(° C./Ft)*ADC_altitude (Ft)

3. Compute difference between SAT and T_standard

Delta_T(° C.)=SAT(° C.)−T_standard(° C.)

4. Convert T_standard from ° C. to Kelvins.

T_standard (Kelvins)=273.15+T_standard(° C.)

5. Compute the natural logarithm of the ratio of Standard Atmosphere temperature to sea level temperature, both expressed in Kelvins.

Log_Temp_Ratio=ln[Tstandard (Kelvins)/288.15 (Kelvins)]

6. Compute the correction to the ADC altitude

Delta_altitude (Ft)=Delta_T(° C.)*Log_Temp_Ratio/0.0019812(° C./Ft)

Compute the temperature-corrected ADC altitude

Temp_comp_altitude (Ft)=ADC_altitude (Ft)−Delta_altitude (Ft)

Field Method of Temperature Compensation (Used Below 12000 Ft.)

In the preferred embodiment of the present invention, the Field Method of Temperature compensation is employed below 12000 ft. At these altitudes, the method of the present invention computes a temperature compensated altitude correction according to the following equation:

$$\text{Altitude\_correction} = h*(15-t0)/\{273.15+t0-0.5*k*(e+h)\}$$

Where altitudes are in feet and temperatures in Celsius, h is the height above the facility, k is the standard temperature lapse rate (0.0019812 Celsius/ft), e is the facility elevation, and t0 is the facility temperature adjusted to mean sea level: t0=facility temperature+k*e.

When the Field method is selected, the method of the present invention corrects ADC altitude at least every 100 msec as follows:

1. Obtain ADC altitude in feet (see ADC Altitude section), field elevation in feet, and static air temperature (SAT) in ° C.
2. Estimate Airfield Temperature T_field(° C.)=SAT(° C)+0.0019812(° C./Ft)*(ADC_altitude−Field_elevation) (Ft)

Adjust airfield temperature to mean sea level

T_field_MSL(° C.)=T_field(° C.)+0.0019812(° C./Ft)*Field_elevation (Ft)

Compute the correction to the ADC altitude.

Delta_altitude (Ft)=(ADC_altitude−Field_elevation)*(15−T_field_MSL)/{273.15+T_field_MSL−0.5*0.0019812*ADC_altitude}

Compute the temperature-corrected ADC altitude

Temp_comp_altitude (Ft)=ADC_altitude (Ft)−Delta_altitude (Ft)

SRD1847 When the Field method is selected, TAWS shall filter discontinuities in Airplane Altitude occurring after the reference airport changes Selection of Airplane Altitude The present invention derives Airplane Altitude from various sources, depending on altitude band, the availability or quality of GPS altitude, and the availability of static air temperature (SAT).

Above FL360, Airplane Altitude is set to 1) the 98.8-percentile lower bound of GPS Altitude, or 2) ADC Altitude.

Below FL360, Airplane Altitude is set to 1) the 98.8 percentile lower bound of GPS altitude, or 2) the temperature-compensated (either en route or field method compensated) ADC altitude, or 3) the uncompensated ADC altitude.

FIG. 13 shows the parameters utilized by the present invention to select the Airplane Altitude settings. As depicted therein, below FL360, the present invention compares ADC Altitude or Temperature-compensated ADC Altitude with GPS Altitude to detect errors in baro altitude or in temperature-compensated altitude. If the difference between ADC or TC altitude is outside the 2.5*Sigma GPS band, if the Vertical Dilution of Precision (VDOP) is less than 4, and if the use of GPS altitude is configured, the present invention sets Airplane Altitude to GPS Altitude minus 2.5 times the standard deviation of the GPS altitude error. There is a 0.9876 probability that the GPS altitude errors are less than 2.5 standard deviations. In feet, this equals 2.5*14 meters*3.28 ft/meters*VDOP=114.8*VDOP feet.

The value of 14 meters represents the User Equivalent Range Error when the GPS signal is not degraded (it would be 33.3 meters if the signal were degraded, when Selective Availability, SA, is on). It is unlikely that SA would ever be turned back on; the figure of 33.3 meters is slightly pessimistic.

GPS altitude is not used to compute Airplane Altitude when VDOP>4. The GPS ICD shows 95-percentile vertical errors around 140 meters near the poles. The data were taken when SA was on. Therefore 2*33*VDOP=140, resulting in a VDOP of 2.1. Field data collected at a site in Norway show VDOPs slightly above 3.5.

If VDOP=1, the 2.5*Sigma value is 114.8 feet. This is about five times the altitude uncertainty due to the barometric setting (20 feet) and was chosen to ensure that TAWS would not switch to GPS after the barometer is properly set, for example during approach.

Setting airplane altitude to GPS altitude minus 2.5 standard deviations (instead of the unbiased GPS altitude) is equivalent to reducing the required obstacle clearance by the vertical uncertainty bounds. TAWS treats horizontal position uncertainty in a similar way.

The present invention uses a filtered VDOP when computing the vertical GPS errors to prevent normal variations in VDOP from causing altitude changes. A first order filter with a time constant of 10 seconds is used in the preferred embodiment. Additional constraints taken into account in the preferred embodiment of the present invention are as follows:

1. The present invention uses filtered values of VDOP in the computation of airplane altitude;

2. Temperature compensation and the use of GPS altitude in computing airplane altitude shall be enabled in air after the Take-off-go-around (TOGA) state becomes false.

Note: This does not imply that Temp Comp or the use of GPS altitude in the airplane altitude computation is disabled if TOGA subsequently becomes true;
3. GPS altitude shall be available for computing airplane altitude when 1) allowed by configuration, 2) GPS altitude is valid, 3) VDOP is valid, 4) VDOP<4, and 5) GPS is enabled.

Note: Temperature-compensated altitude shall be available for computing airplane altitude when 1) allowed by configuration, 2) ADC altitude is valid, 3) SAT is valid, and 4) temperature compensation is enabled;
4. If ADC altitude is below FL360, and SAT is unavailable, and temperature compensation is configured, TAWS logs the fault "TEMP COMP ALT FAIL NO SAT";
5. TAWS shall filter discontinuities in Airplane Altitude occurring after the source of Airplane Altitude Settings has changed;
6. In the preferred embodiment, a filter with a time constant of 2 seconds smoothes discontinuities in Airplane Altitude. Smoothing of jumps in airplane altitude is discontinued after the filter has been active for three time constants (6 seconds). Transients after power-up are not filtered. The software has a fourth altitude source of "none". Switching from source "none" to a valid source does not result in the filter being turned on. Therefore, TAWS immediately goes to the altitude from the first valid source after a power-up (or after a loss of altitude because of some failure);
7. The rate of change of Airplane Altitude is limited to 20,000 ft/min. The source of Airplane Altitude can be ADC, temperature-compensated ADC (TC ADC), or GPS. Transitions between any sources are possible. TAWS changes the source of Airplane Altitude according to Table 6-33 Airplane Altitude Settings after imposing a three-second delay;
8. If the Airplane Altitude source becomes ADC, it shall stay ADC until the TC ADC altitude or GPS-derived altitude has been valid and stable for three seconds, and the switch to ADC or GPS is required by FIG. 13, Airplane Altitude Settings;
9. If the Airplane Altitude source becomes TC ADC, it shall stay TC ADC until the ADC altitude or GPS-derived altitude has been valid and stable for three seconds, and the switch to ADC or GPS is required by Table 6-33 Airplane Altitude Settings;
10. If the Airplane Altitude source becomes GPS, it shall stay GPS until the ADC or TC ADC has been valid and stable for three seconds, and the switch to ADC or TC ADC is required by FIG. 13 Airplane Altitude Settings;
11. If the current source of Airplane Altitude becomes invalid, TAWS shall immediately switch to a new source according to Table 6-33 Airplane Altitude Settings.
12. The system of the present invention shall not apply the three-second delay to transitions to or from the state defined by Airplane Altitude Source=None;
13. GPS altitude used in the computation of Airplane Altitude shall be referenced to MSL;

Note: The use of GPS altitude in the computation of Airplane Altitude is a configuration option.

The option to inhibit setting Airplane Altitude to (GPS Altitude−2.5*Sigma) when ROC is small (during Approach) was considered. Under normal conditions, Airplane Altitude is baroderived during approach, and therefore the option to inhibit the use of GPS would not be exercised in this case. If there are gross errors in baro altitude during approach the present invention could switch to GPS-based altitude and this could trigger ROC alerts. Inhibiting the use of GPS to prevent these alerts would not compromise aircraft safety because RA-based alerts (and alerts from other aircraft systems) would notify the crew of problems with the baro setting. However, determining that the aircraft is indeed in an approach to land requires complex logic that is not in proportion with the slight performance improvements. For this reason, it was decided not to prevent the use of GPS as altitude source during approach.

The value of the rate limit of Airplane Altitude is also used to limit the rate of change in SAT: Maximum rate of change of SAT=Standard Atmosphere Lapse Rate (° C./Ft) *20,000 Ft/min=39.624 (° C./min).

Determining Coordinate System Transformation

When airplane altitude is compensated for cold temperatures, or when the system altitude source is GPS, airplane altitude becomes different from the ADC altitude indicated on the Primary Flight Display (PFD). If not handled correctly, this can result in depictions that are inconsistent with the altutude and vertical deviation indicated on the PFD.

In the present invention There are several scales or "coordinate systems" used for the representation of Altitude/Elevation data. This section is concerned with the relation between Geometric, Barometric and Avionics systems Geometric altitude scales and their use in graphic depictions.

Geometric Altitudes are those of the scale of the terrain database. They are MSL based altitudes, independent of atmospheric conditions.

For the purposes of this section, Geometric Altitude refers to the scale with MSL as the zero point of the scale. Geometric data can also be represented using the WGS84 system having a zero point that differs from MSL. In the preferred embodiment of the present invention, the MSL system is used.

Barometric Altitudes are those that are either calculated (assuming standard atmospheric conditions) from or are referenced to a pressure measurement. Examples include the altitude indicated on the PFD (the ADC altitude) and Waypoint altitudes in the FMS flight plan. Waypoint altitudes are Barometric because Vertical Deviations are computed by comparing waypoint altitudes to the Barometric ADC altitude.

Avionics systems Geometric Altitudes or 'corrected altitudes' are those that TAWS computes from Barometric or GPS data for comparison to the Geometric Altitudes in the terrain database and for depictions. TAWS Geometric altitudes are an estimation or approximation of the true Geometric Altitude and may differ somewhat from the true Geometric Altitude depending upon the Avionics systems altitude source and safety related adjustments for probable errors.

On a standard (ISA) day, the altitude scales are all identical. On non-standard days, Barometric and Geometric scales can be significantly different. In order to produce a consistent graphical depiction, Avionics systems must be able to determine the corresponding Geometric altitude of any Barometric data; i.e. Avionics systems must convert all data to the same scale.

Figure 14:
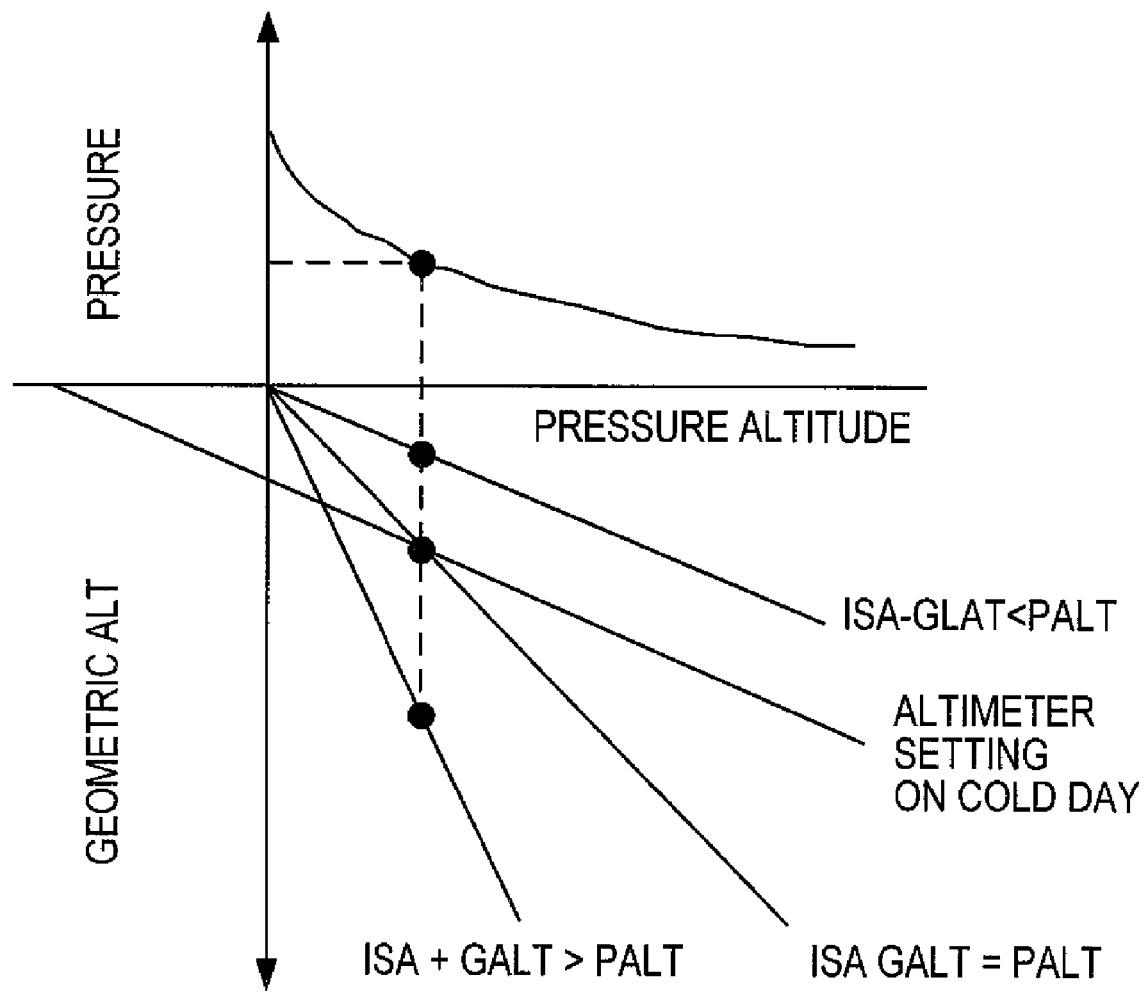
FIG. 14 shows the relationship between the Barometric and Geometric scales on standard and non-standard days.

FIG. 14 shows the relation between the Barometric and Geometric scales on standard and non-standard days. It also shows the effect of adjusting the altimeter setting for airport elevation. On a cold day, the air is dense and the change in pressure with altitude is greater than on a standard day. This results in a Barometric altitude that is higher than the Geometric Altitude. But because the altimeter must read correctly at the airport field elevation, the altimeter setting (baro-correction) is adjusted, shifting the line on the conversion chart upward. On a hot day, the line is shifted downward. Avionics systems determines the conversion between the Barometric and Avionics systems Geometric scales from the reference field elevation (FieldElev) and the difference between the barometric ADC altitude (AdcAlt) and the TAWS Geometric airplane altitude (TawsAlt) in the following manner.

$$TawsGeoAlt = BaroAlt + (TawsAlt - AdcAlt) * (BaroAlt - FieldElev)/(AdcAlt - FieldElev)$$

The form of this equation is chosen to emphasize that the correction to the BaroAlt (the second term) is proportional to the difference between the Geometric Airplane altitude and the ADC altitude (note that this is measured, not estimated, when using GPS as the altitude source) and proportional to the ratio of the heights above the field.

The conversion between Avionics systems corrected altitude (Geometric Altitude) and Barometric Altitude may be simplified to:

$$TawsGeoAlt = ScaleFactor * BaroAlt - FieldOffset$$
Where
$$ScaleFactor = 1 + R,$$
$$FieldOffset = FieldElev * R,$$
and
$$R = (TawsAlt - AdcAlt)/(AdcAlt - FieldElev).$$

Normally, the difference between Geometric and Barometric Altitude (TawsAlt−AdcAlt), is expected to approach zero as the ADC altitude approaches the field elevation so that R is well behaved. However, altimetry errors are likely to cause a division by zero when calculating R as the aircraft approaches the field elevation. In order to prevent this, FieldElev (for calculation of R) is chosen in the following way:

```
IF(abs(TawsAlt − AdcAlt) > 1.0 ft)
    FieldElev = The lower of the destination airport elevation or
        (AdcAlt − 4.0*abs(TawsAlt − AdcAlt))
    R = (TawsAlt − AdcAlt)/(AdcAlt − FieldElev)
ELSE
    R = 0
ENDIF
```

Differences in TawsAlt and AdcAlt are accountable to non-standard temperatures. The constant 4.0 in the determination of FieldElev was chosen as a limit corresponding to a deviation of about ±55 degrees Centigrade from ISA.

The avionics systems uses the coordinate transform for graphic depictions of the flight plan and barometric scale and also in calculating the FPIA alerts. Both are tied to the flight plan and only look from the present position forward along the path. Therefore the airport elevation used for determining FieldElev should always be the FMS flight plan destination elevation and never the departure airport elevation.

If the flight plan has a destination, Avionics systems shall use the destination elevation as the field elevation in calculating the Barometric to Avionics systems Geometric coordinate transform. If the flight plan does not have a destination Avionics systems shall use sea level.

The effects of transforming all Barometric altitude data to the Avionics systems Geometric scale for depiction are (regardless of the source of Airplane Altitude):
1. The aircraft position is correctly depicted relative to terrain
2. The flight plan is correctly depicted relative to terrain
3. The aircraft position is correctly depicted relative to the flight plan
4. The ownship and waypoint altitudes as determined from the depictions are consistent with the flight deck.

The following constraints apply when the source of the Avionics System altitude is a fixed GPS altitude while barometric altitude is varying through introduction of errors:
1. The depicted separation between aircraft and terrain shall not change when the Avionics System is using a fixed GPS altitude as its altitude source and the barometric altitude is varied;
2. On depictions that have an altitude scale (e.g. the Profile view), that scale shall move so that the depicted aircraft altitude remains consistent with the barometric altitude when Avionics System is using a fixed GPS altitude as its altitude source and the barometric altitude is varied;
3. On depictions that have an altitude scale (e.g. the Profile view) that scale shall stretch or shrink so that the depicted altitude of the terrain at the flight plan destination airport does not change when the Avionics system is using a fixed GPS altitude as its altitude source and the barometric altitude varies over a physically reasonable range.
4. Flight plan waypoints shall move with the altitude scale on the display (e.g. Profile view) so that the depicted waypoint altitudes remain consistent with the altitudes on the flight plan when Avionics System is using a fixed GPS altitude as its altitude source and the Barometric altitude is varied.

The following constraints apply when the barometric altitude is fixed while the source of Avionics System altitude is a varying GPS or temperature-compensated altitude.
1. When the barometric altitude is fixed and the Avionics System is using a varying GPS or Temperature Compensated altitude as its altitude source, the aircraft altitude determined from the displays e.g Profile view's altitude scale shall remain fixed and consistent with the Barometric altitude even though the depicted aircraft to terrain separation varies;
2. When the barometric altitude is fixed and the Avionics System is using a varying GPS or Temperature Compensated altitude as its altitude source, waypoints at the Barometric altitude shall be depicted fixed at the aircraft altitude while the separation between aircraft and terrain varies on the displays;
3. With fixed barometric altitude, the altitude scale on the displays, e.g. Profile view, shall stretch or shrink so that the depicted altitude of the terrain at the FMS flight plan destination airport does not change with physically reasonable variations in the GPS or Temperature Compensated altitude the Avionics system is using as its altitude source; and
4. When the barometric altitude is fixed and the Avionics System is using a varying GPS or Temperature Compensated altitude as its altitude source, depicted waypoints shall move with the altitude scale on the display e.g. Profile view so that their altitudes remain consistent with the altitudes on the flight plan.

The present invention utilizes a temperature compensated altitude technique for ISA− conditions. Second, the present invention uses a GPS altitude data compensation technique when within Vertical Dilution of Precision (VDOP) limits. VDOP is one of the components of Geometric Dilution of Precision (GDOP) which relates to the effect of the geometry of position information provided by satellites.

Figure 4:
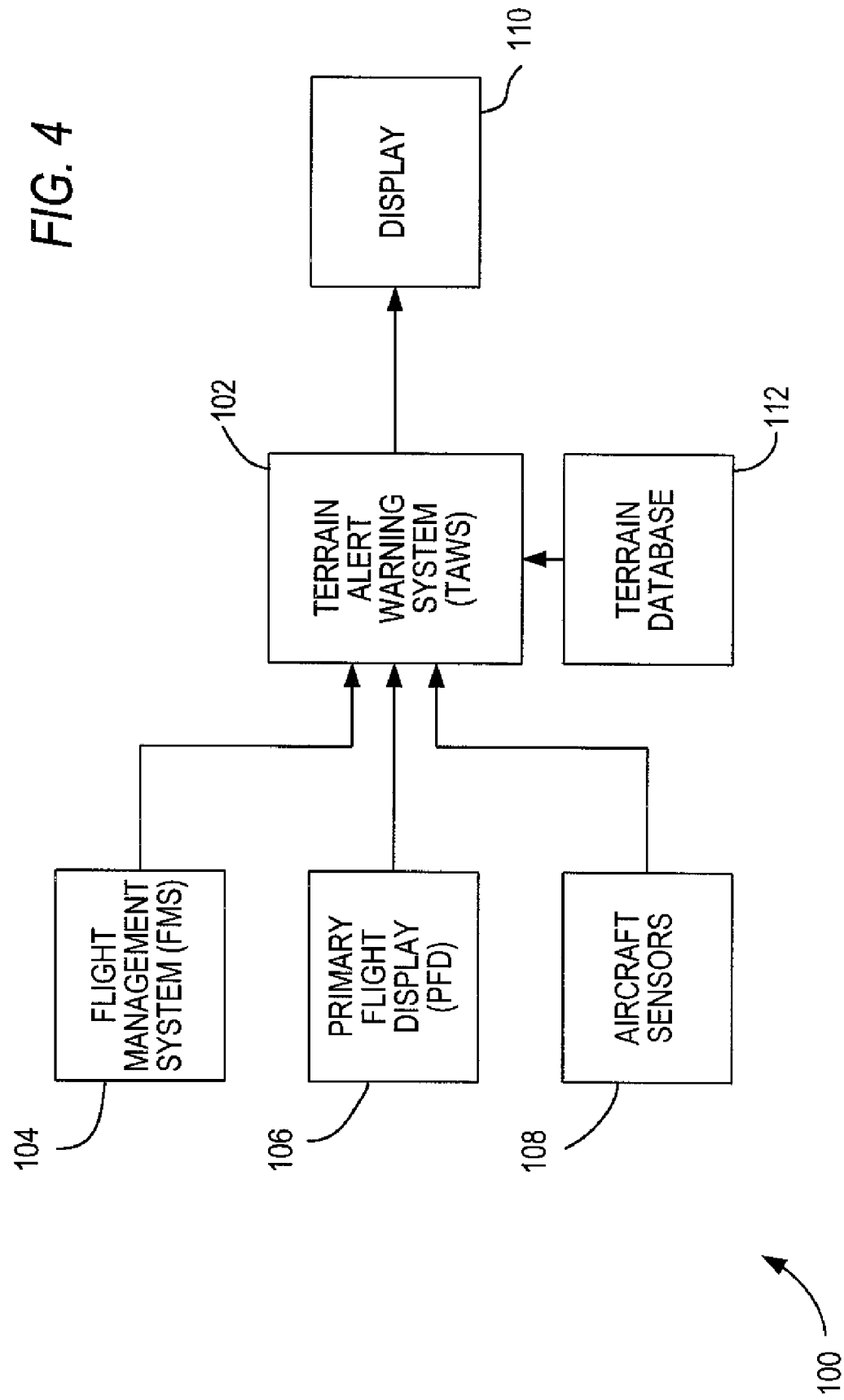
FIG. 4 depicts a block diagram of an avionics system configured for temperature and GPS altitude compensation according to an embodiment of the invention.

FIG. 4 shows a block diagram of a TAWS 100 configured for temperature and GPS altitude compensation according to an embodiment of the present invention. The TAWS 100 receives altitudes flight plan information from a Flight Management System (FMS) 104. The FMS 104 may include a Control Display Unit (CDU) (not shown) for entering flight plan information including vertical range control data. Information regarding the status of the aircraft while in flight is processed by a Primary Flight Display (PFD) 106. Aircraft sensors 108 provide altitude information (e.g., Barometric, GPS and ADC altitude) and a Terrain database 112 provides information regarding the terrain in the vicinity of the aircraft. The TAWS 100 includes a processor module 102 having hardware (e.g., processor) and software elements (e.g., instructions stored in memory) (both not shown) configured to implement a method to receive the above information, perform temperature and GPS compensated altitude computation and display the results on a display 110. The method of the present invention is described in further detail below.

Figure 5:
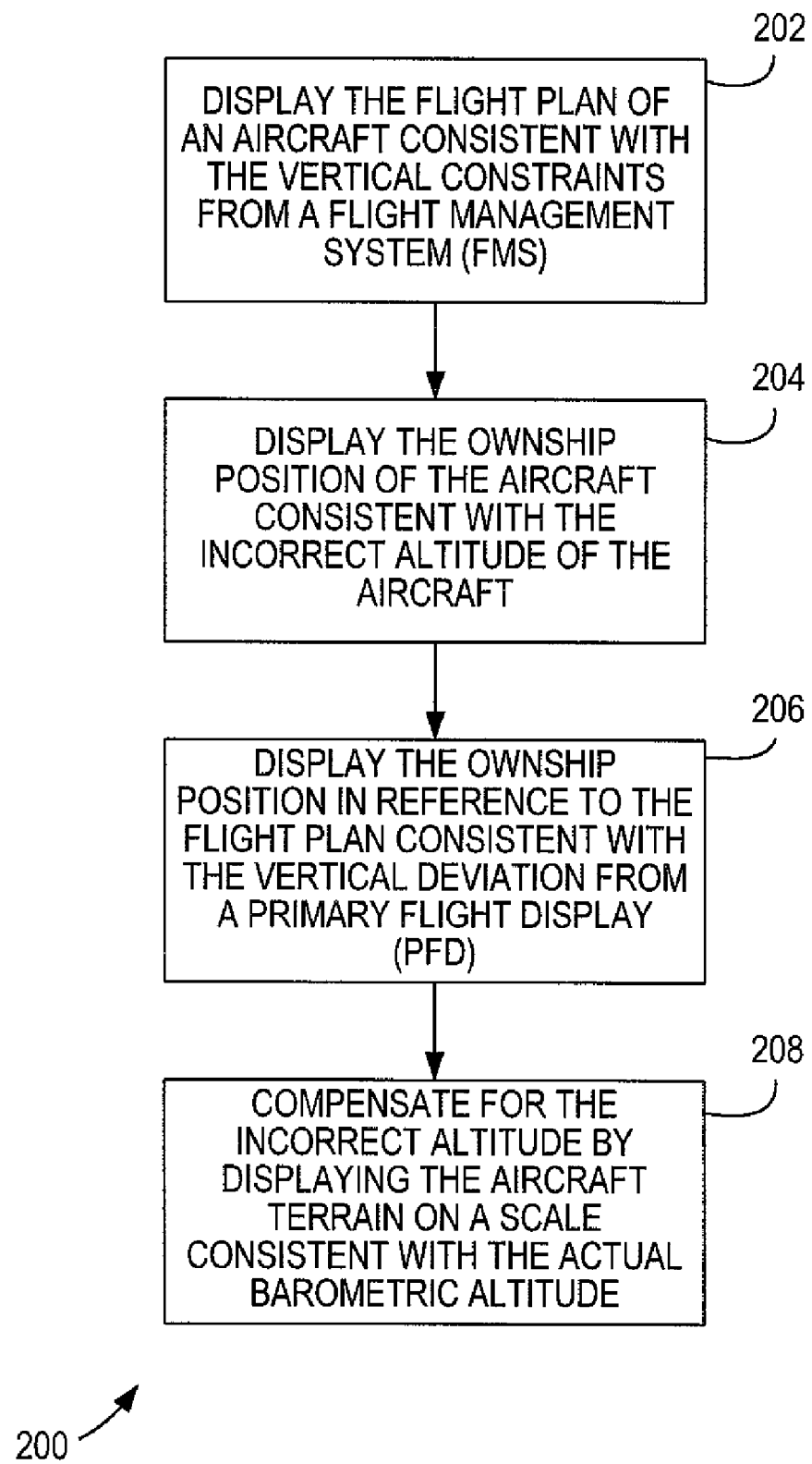
FIG. 5 depicts a high level flow chart of an altitude compensation technique according to an embodiment of the invention.

FIG. 5 depicts a high level flow chart 200 of a temperature compensated altitude computation method according to an embodiment of the invention. The method compensates for an incorrect altitude of an aircraft caused by an inaccurate altimeter setting, inaccurate altimeter sensor including a barometric altimeter or an air data computer (ADC) or other error source. In step 202, the method displays the flight plan of an aircraft consistent with the vertical constraints from an FMS. In step 204, the method displays the ownship position of the aircraft consistent with the incorrect altitude of the aircraft. In addition, in step 206, the method displays the ownship position in reference to the flight plan consistent with the vertical deviation from a PFD. In step 208, the method compensates for the incorrect altitude by displaying the aircraft terrain on a scale consistent with the actual barometric altitude thereby accurately displaying the ownship position and the flight plan in reference to the terrain. The temperature compensating technique 208 is described in detail below.

Figure 6:
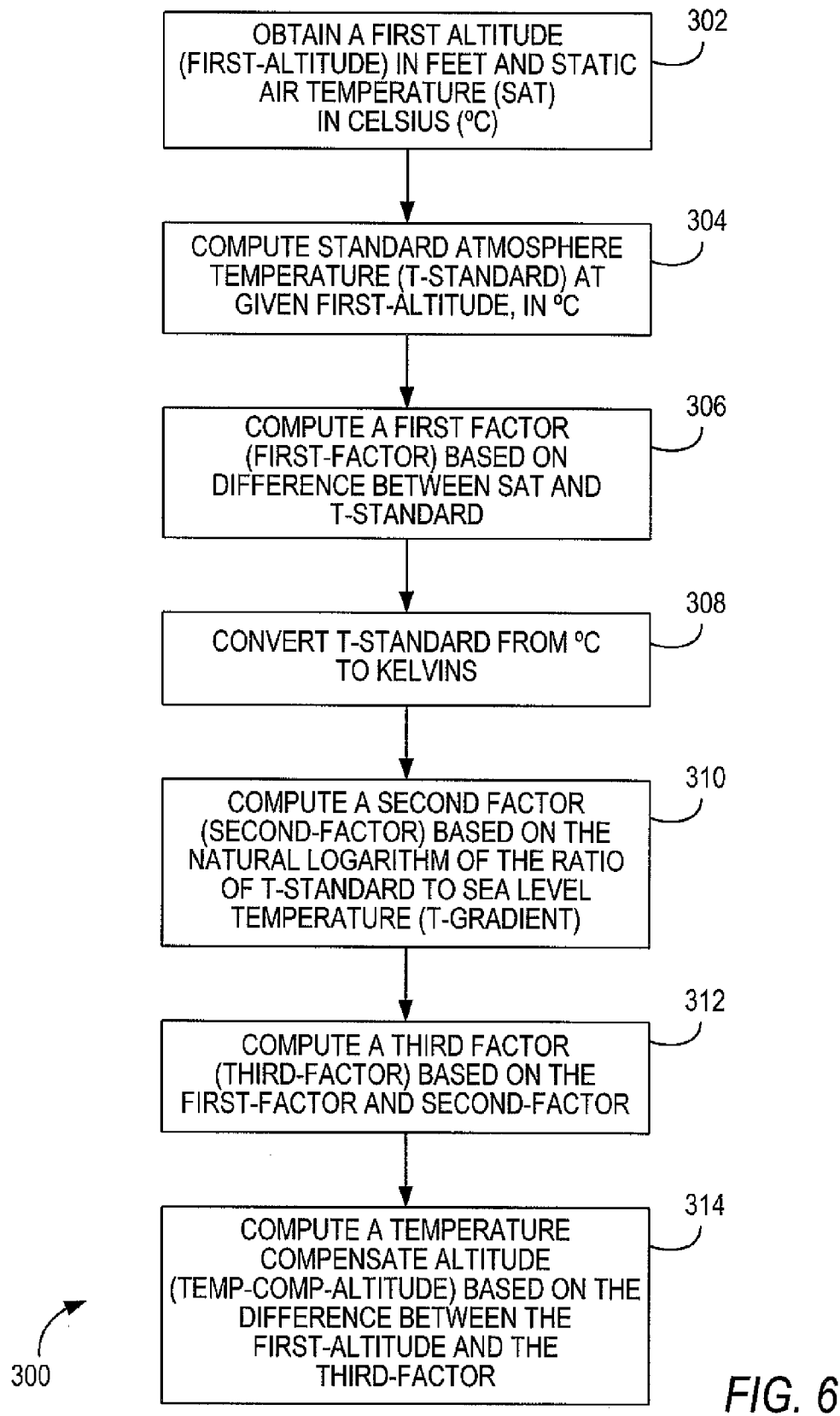
FIG. 6 depicts a detailed flow chart of the compensation technique of FIG. 5 according to an embodiment of the invention.

FIG. 6 depicts a detailed flow chart of the temperature compensated altitude computation method 300 according to an embodiment of the invention. In a preferred embodiment of the present invention a TAWS compensates for the altitude (of an aircraft from an altitude sensor such as a barometric altimeter or ADC) below the troposphere at least every 100 milliseconds. In a first step 302, the technique uses aircraft sensors to obtain a first altitude in feet (First-Altitude) and static air temperature (SAT (° C.)) in Celsius (° C.) which is the temperature of the air surrounding the aircraft.

In step 304, the method computes Standard Atmosphere Temperature (T-Standard (° C.)) in ° C at the First-Altitude according to the following:

$$T\text{-Standard}(° C.) = (T\text{-Sea-Level}) - (T\text{-Gradient}*\text{First-Altitude}),$$

where T-sea-level is the standard temperature gradient below the troposphere and is equal to 0.0065° C./meter (0.0019812° C./Ft) and T-Gradient is the Standard temperature at sea level and is equal to 5° C. (288.15 Kelvins).

In step 306, the method computes a first factor (First-Factor) based on the difference between SAT (° C.) and T-standard (° C.) as follows:

$$\text{First-Factor} = \text{SAT}(° C.) - T\text{-Standard}(° C.).$$

In step 308, the method converts T-Standard (° C.) from ° C. to Kelvins as follows:

$$T\text{-Standard(Kelvins)} = \text{Conversion-Factor} + T\text{-Standard}(° C.),$$

where the Conversion-Factor is equal to 273.15.

In step 310, the method computes a second factor (Second-Factor) based on the natural logarithm of the ratio of Standard Atmosphere Temperature (T-Standard (Kelvins)) to sea level temperature (T-Gradient), both expressed in Kelvins:

$$\text{Second-Factor} = \ln[T\text{-Standard(Kelvins)}/T\text{-Gradient}].$$

In step 312, the method computes a third factor (Third-Factor) based on the First-Factor and the Second-Factor as follows:

$$\text{Third-Factor} = \text{First-Factor}*\text{Second-Factor}/T\text{-Sea-Level}.$$

In step 314, the method computes a temperature compensated altitude (Temp-Comp-Altitude) based on the difference between the First-Altitude and the Third-Factor as follows:

$$\text{Temp-Comp-Altitude} = (\text{First-Altitude}) - (\text{Third-Factor}).$$

In the preferred embodiment, the method applies the temperature compensated altitude (Temp-Comp-Altitude) if the following conditions are satisfied: (a) the First-Altitude less than FL360 (3600 feet); (b) ISA conditions are below standard (ISA−); and (c) the temperature compensated altitude (Temp-Comp-Altitude) is lower than the First-Altitude, unless this altitude exceeds GPS 2.5σ altitude limits where σ represents altitude error criteria In this embodiment, temperature compensation as outlined above is applied when an aircraft is cruising enroute between two terminals of a flight plan. In a terminal area, terminal area temperature compensation is applied. Terminal area temperature compensation is applied when the aircraft satisfies the following criteria: (a) the aircraft is below 12000 feet according to Civil Aviation Authority (CAA) and Aeronautical Information Publication (AIP) limits; and (b) the TAWS of the present invention detects a departure or destination airport within 50 miles at a Flight Plan Angle (FPA) of less than 12.5 degrees. It is assumed that the altimeter is set correctly for the departure/destination airport to end temperature compensation offset.

Figure 7:
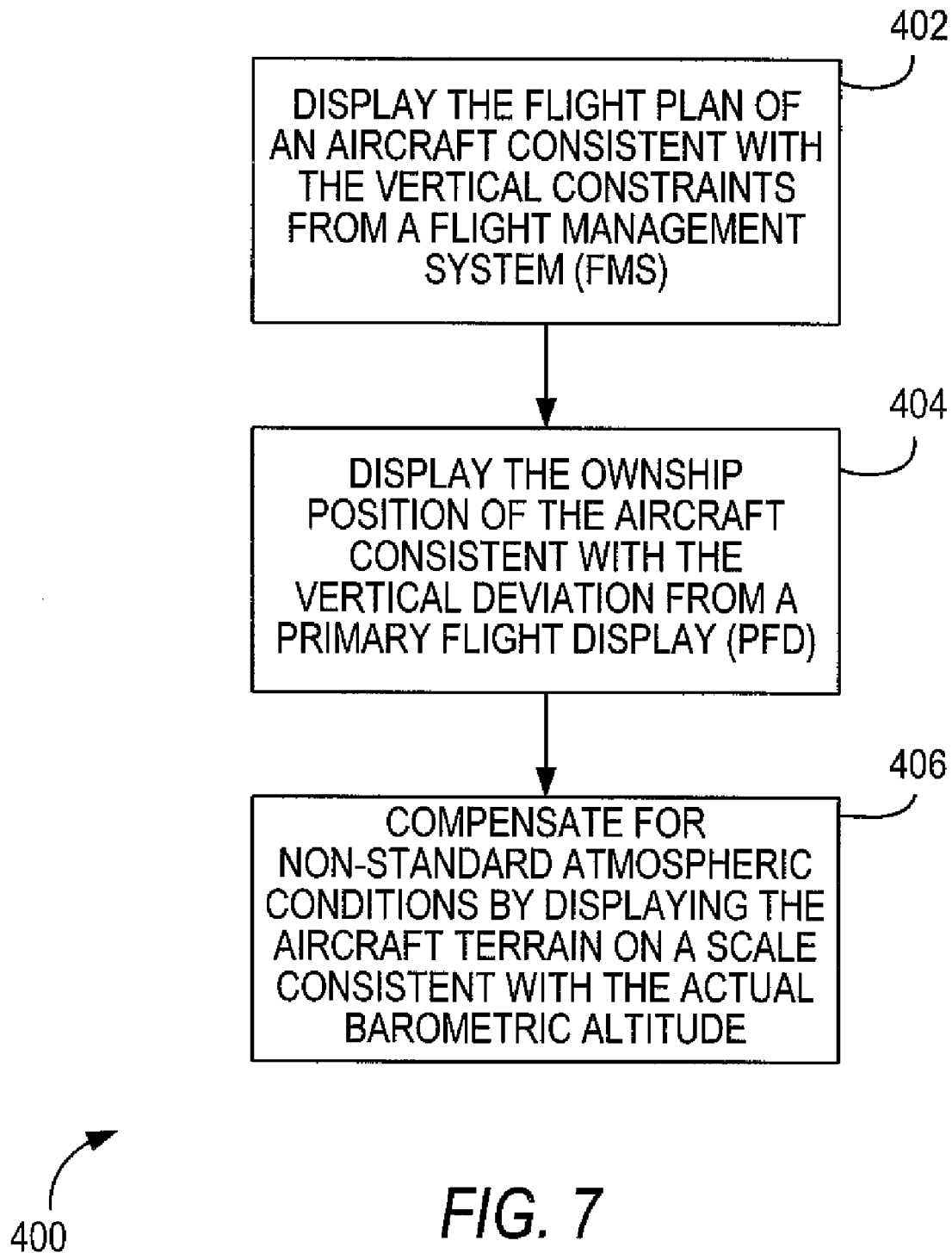
FIG. 7 depicts a high level flow chart of a non-standard day compensation technique according to an embodiment of the invention.

FIG. 7 depicts a high level flow chart 400 of a GPS compensated altitude computation technique according to an embodiment of the invention. The method compensates for non-standard atmospheric conditions (deviation from ISA conditions) of an aircraft such as cold temperature conditions. In step 402, the method displays the flight plan of the aircraft consistent with the vertical constraints from an FMS. In step 404, the method displays the ownship position of an aircraft consistent with the vertical deviation from a PFD. In step 406, the system performs a method for compensating for the non-standard atmospheric conditions by displaying the aircraft terrain on a scale consistent with the actual barometric altitude thereby accurately displaying the ownship position and the flight plan in reference to the terrain. The method 406 for compensating for non-standard atmospheric conditions is described in further detail below.

Figure 8:
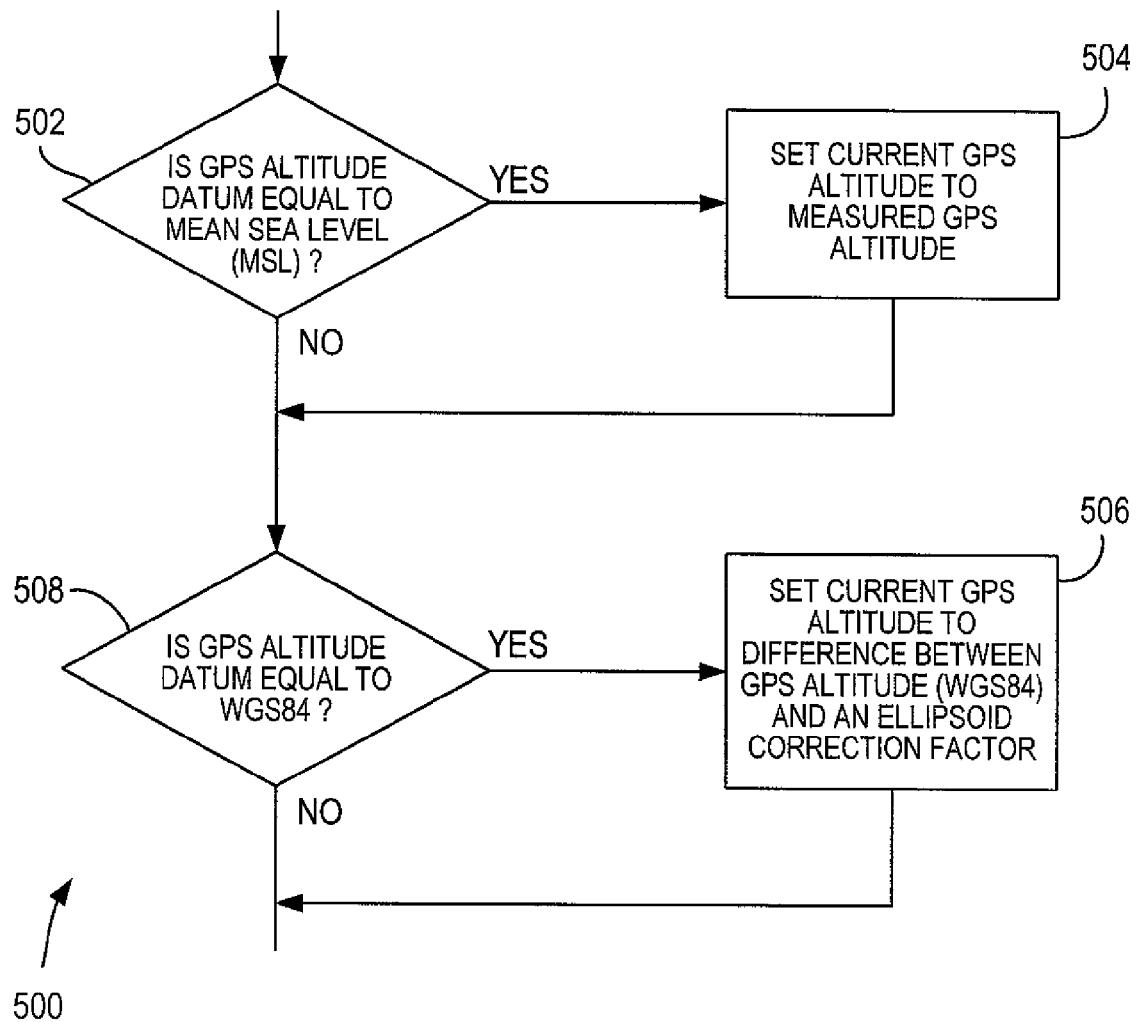
FIG. 8 depicts a detailed flow chart of the compensation technique of FIG. 7 according to an embodiment of the invention.

FIG. 8 depicts a detailed flow chart of the method 500 for compensating for non-standard atmospheric conditions includes a GPS compensated altitude computation technique according to an embodiment of the invention. The method includes evaluating the altitude datum being used during operation of the TAWS. A datum refers to a means by which coordinates are determined. An example of a satellite or GPS based defined datum is the World Geodetic System 1984 (WGS84).

In the preferred embodiment the present invention computes GPS altitude at all altitudes if the following criteria are met: (a) GPS VDOP is less than 4.0; and (b) altitude (from an ADC) goes above or below GPS altitude +/− 2.5σ limits (the GPS −2.5σ altitude is used for TAWS alerts and depiction of terrain elevation). The application of the criteria above, results in the use of GPS altitude data when the altitude (from an ADC) to GPS altitude difference exceeds about 172 feet for GPS with a VDOP of 1.5. In the preferred embodiment the method of the TAWS determines or computes GPS altitude at least every 100 milliseconds. In step 502, the GPS altitude datum is checked to determine whether it is equal to mean sea level (MSL). If they are equal, then step 504 is executed which includes setting the current GPS altitude to the measured GPS altitude. On the other hand, if they are not equal, then step 508 is executed in which the GPS altitude datum is checked to determine whether it is equal to WGS84. If they are equal, then step 506 is executed which includes setting the current GPS altitude to the difference between the GPS altitude as a function of WGS84 and an Ellipsoid Correction Factor. As a result, the method compensates for non-standard atmospheric conditions using GPS altitude measurements.

Figure 2:
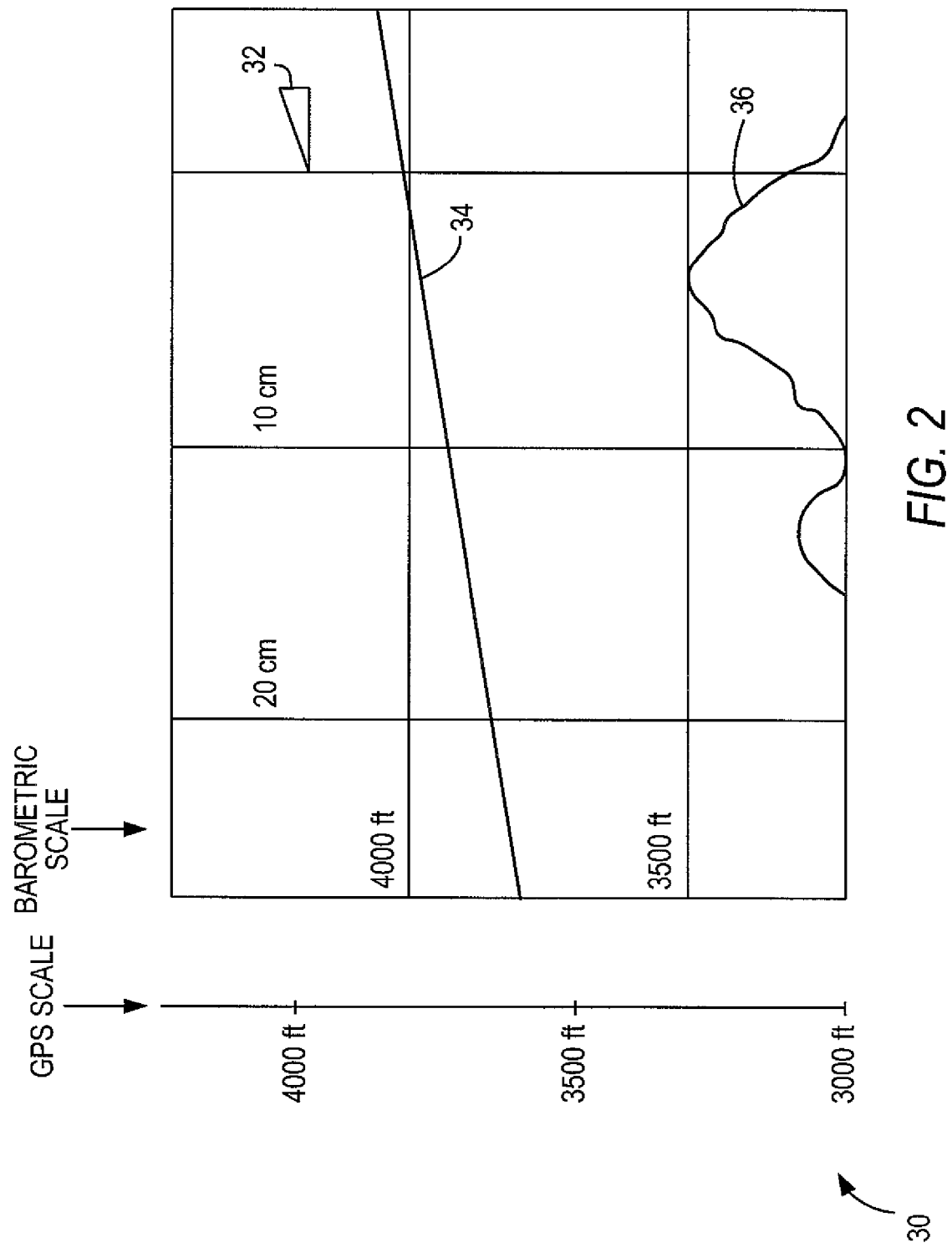
FIG. 2 depicts a flight profile from a conventional avionics system across terrain on a standard day with incorrect altimeter setting.
Figure 9:
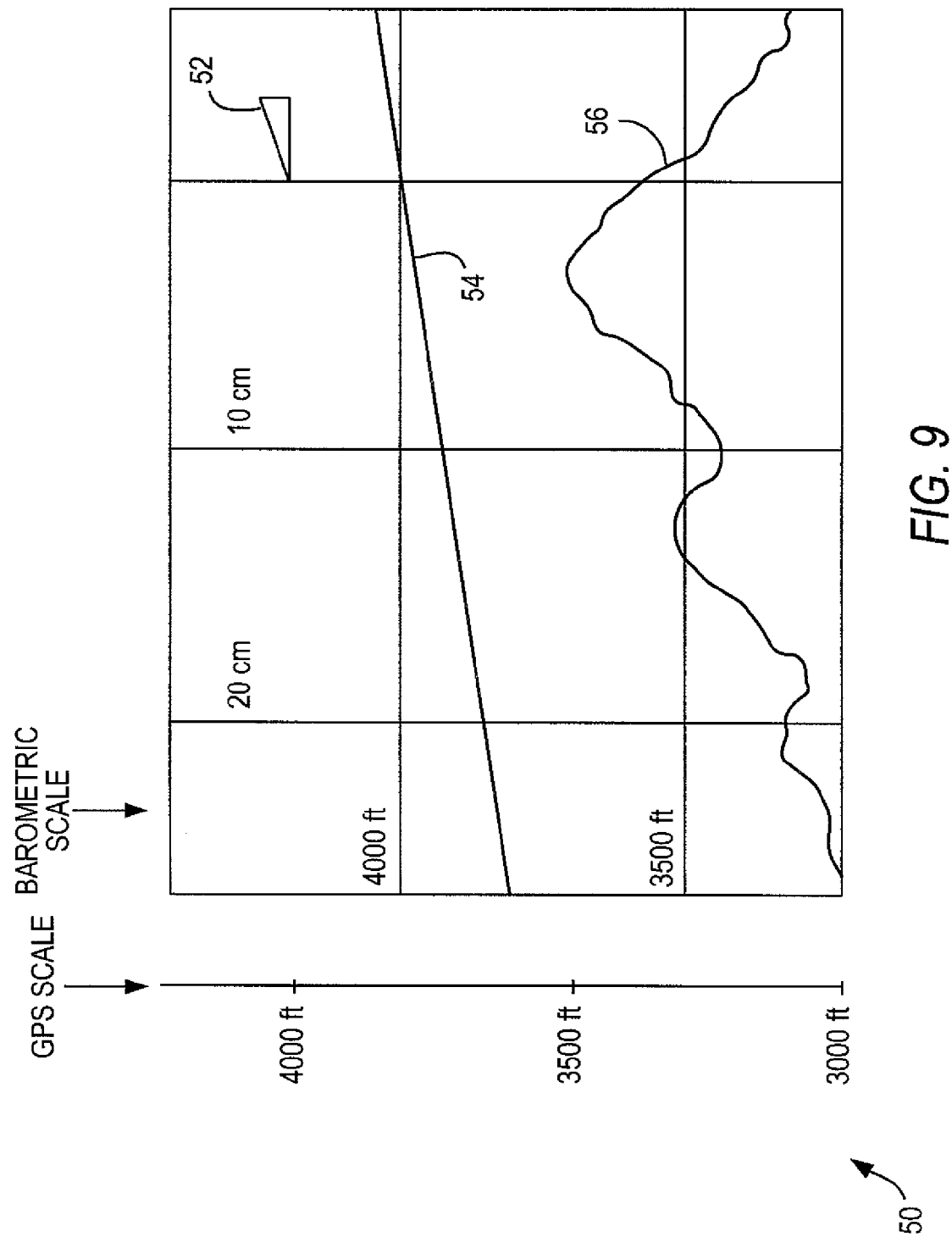
FIG. 9 depicts a flight profile from a TAWS in accordance with the present invention across terrain on a standard day with incorrect altimeter setting.

Referring now to FIG. 9, depicted therein is a flight profile 50 from a TAWS in accordance with the present invention across terrain on a standard day with an incorrect altimeter setting. In contrast to the display characteristics of the system of FIG. 2, FIG. 9 depicts ownship position 52 consistent with the indicated altitude. An FMS flight plan 54 is depicted on a scale consistent with FMS vertical constraints (Barometric). The ownship position 52 in reference to the FMS flight plan 54 is consistent with vertical deviation indicated on a PFD (not shown). In contrast to the profile of FIG. 2, the terrain 56 is now depicted on a scale consistent with actual barometric altitude (the terrain is adjusted upward). In addition, the ownship position 52 and the flight plan 54 are now depicted accurately in reference to the terrain 56. Thus the present invention detects incorrect altimeter settings and corrects the depiction such that the separation between the ownship position 52 and flight plan 54 with the terrain 56 is also accurate.

Figure 3:
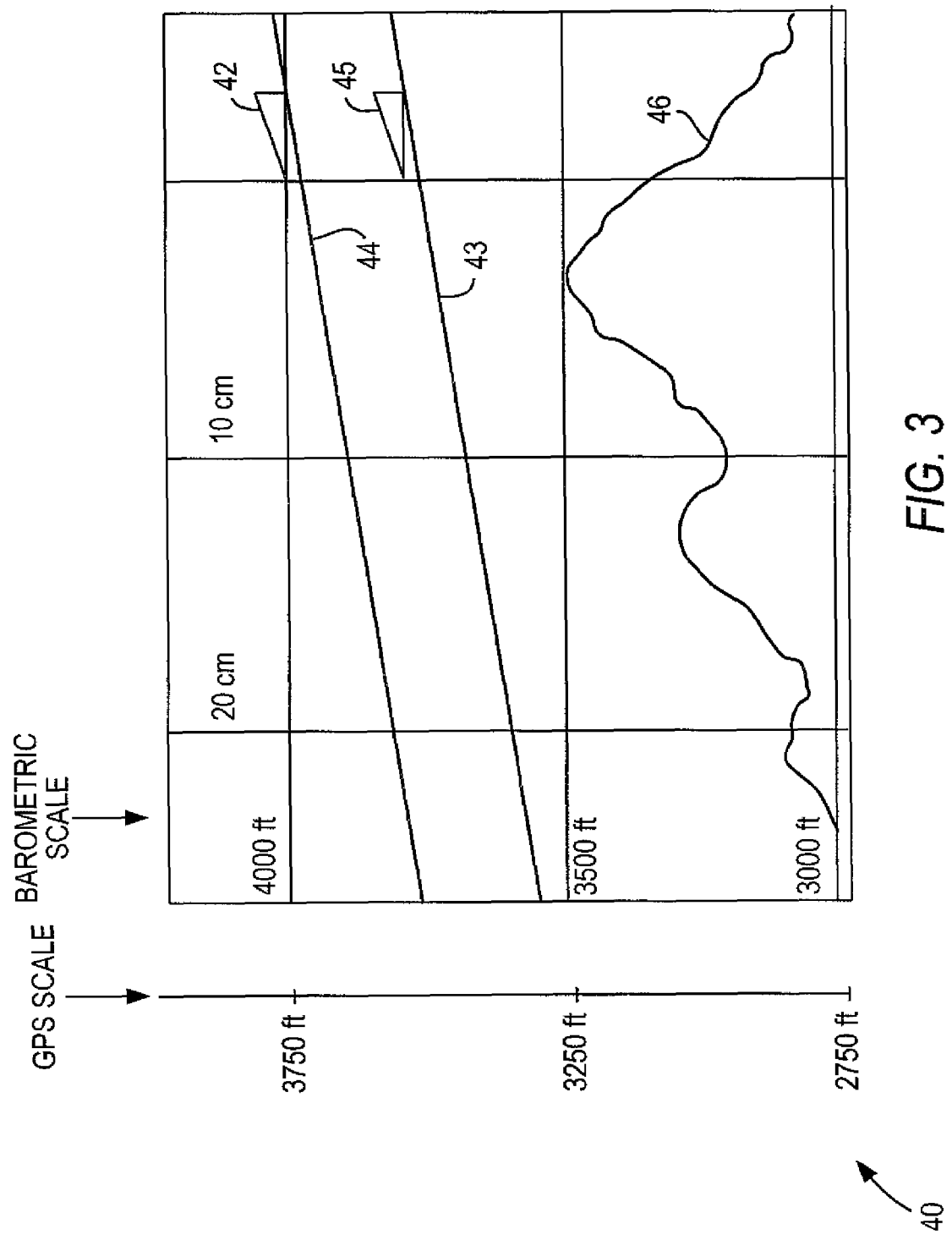
FIG. 3 depicts a flight profile from a conventional avionics system on a non-standard day.
Figure 10:
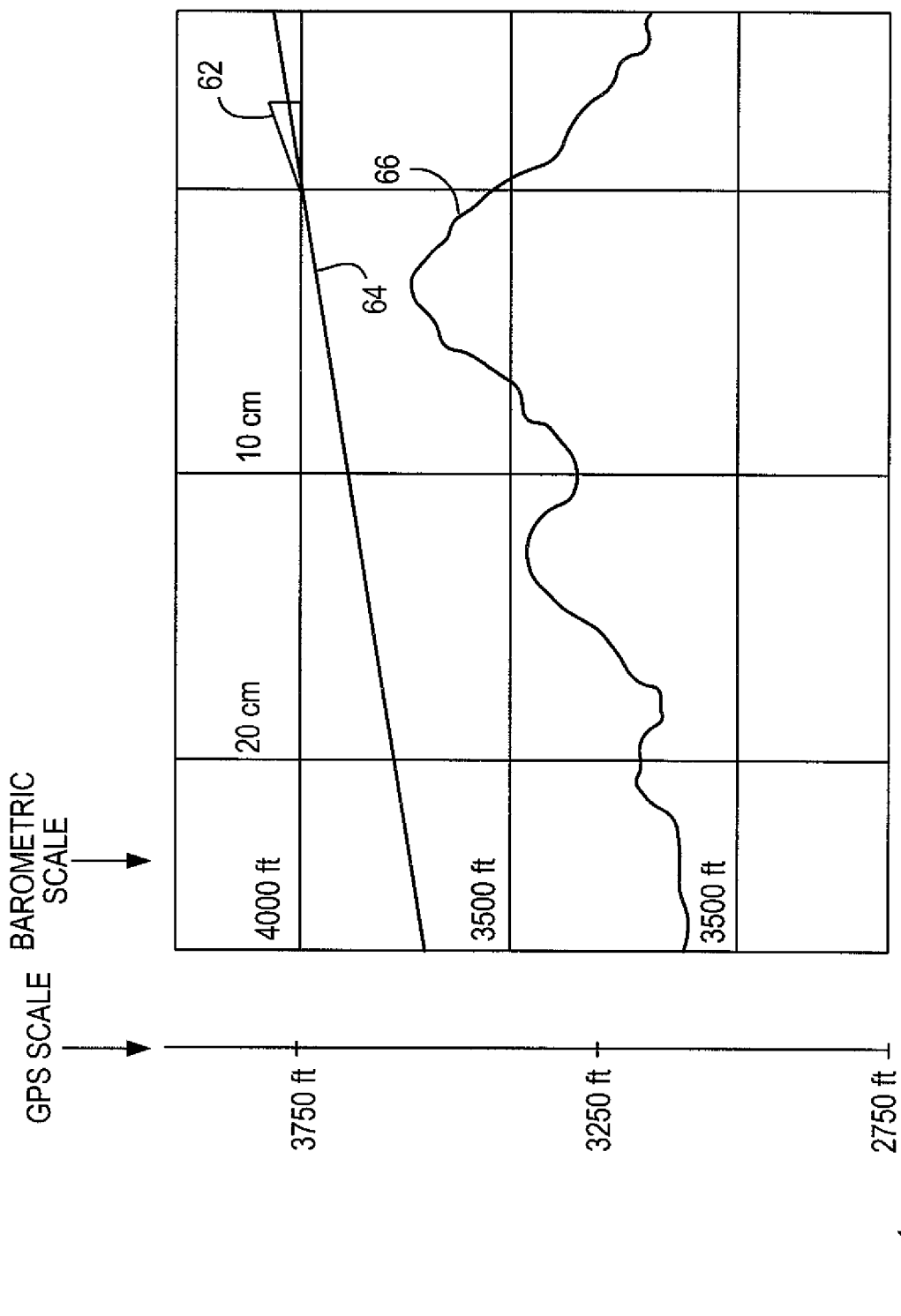
FIG. 10 depicts a flight profile from a TAWS in accordance with the present invention on a non-standard day.

FIG. 10 depicts a flight profile 60 from a TAWS system in accordance with the present invention on a non-standard day (non-standard atmospheric conditions including deviations from ISA conditions such as cold temperature day). As is shown therein, and in contrast to the profile depicted in FIG. 3, when the compensation of the present invention is applied to a non-standard day, ownship position 62 is depicted consistent with the indicated altitude. In addition, FMS flight plan 64 is depicted on a scale consistent with FMS vertical constraints (Barometric). The ownship position 62 in reference to the FMS flight plan 64 is consistent with the vertical deviation indicated on a PFD (not shown). Terrain 66 is now depicted on a scale consistent with actual barometric altitude (the terrain is adjusted upward). In addition the ownship position 62 and flight plan 64 are now depicted accurately in reference to the terrain 66.

Figure 11:
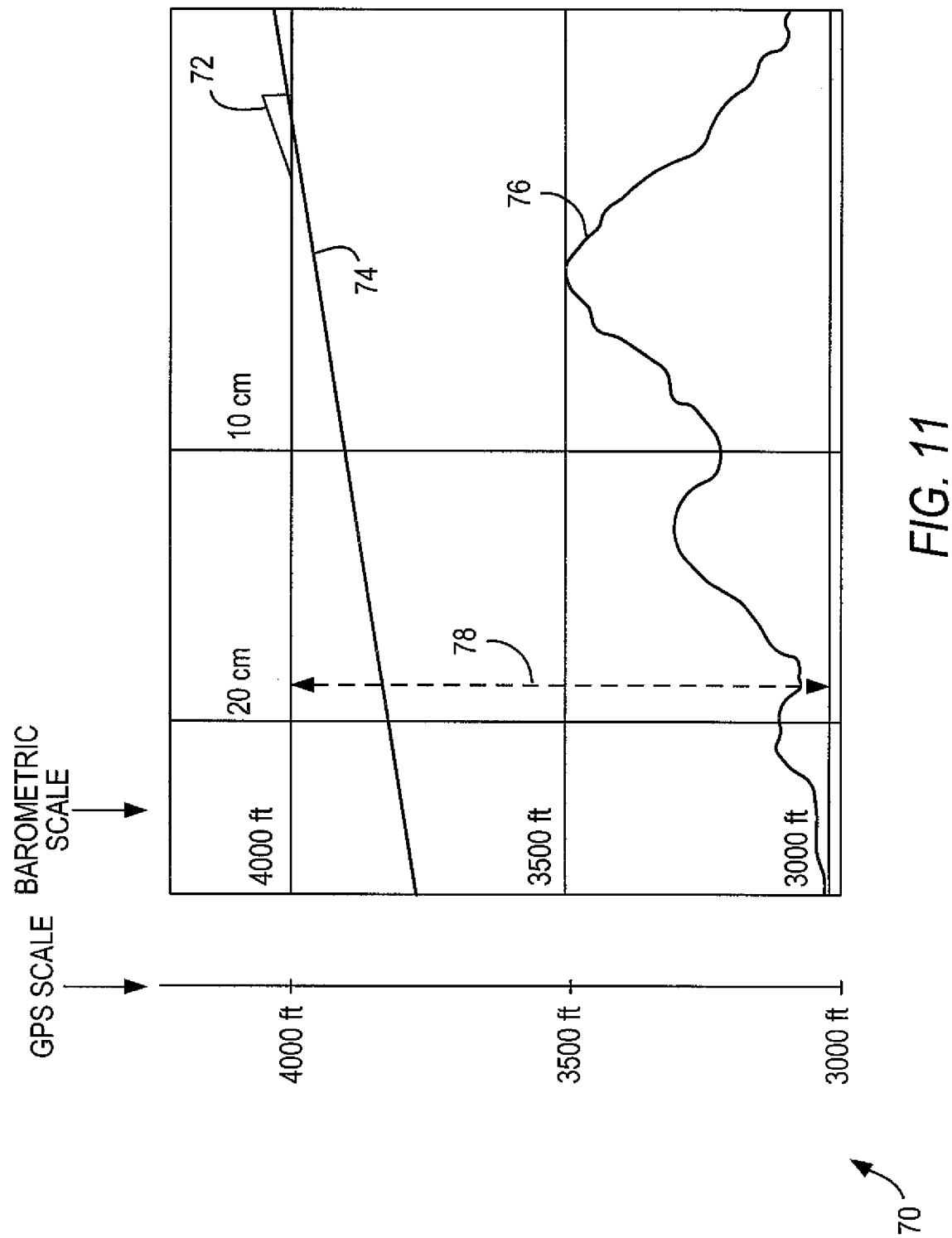
FIG. 11 depicts barometric grid spacing on a profile in accordance with the present invention on a standard day.
Figure 12:
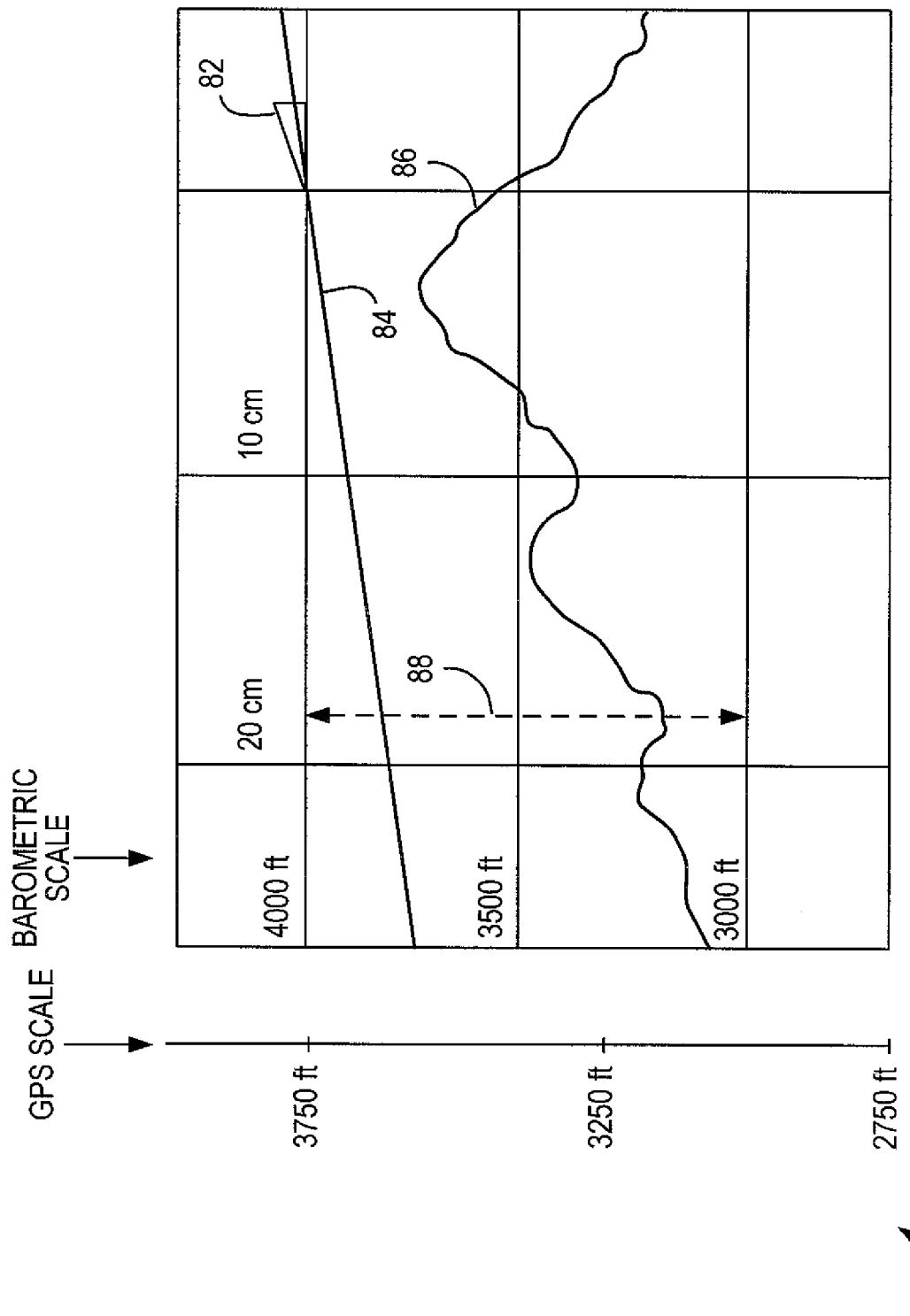
FIG. 12 depicts barometric grid spacing on a profile in accordance with the present invention on a non-standard day.

Turning now to FIGS. 11 and 12, depicted therein are profiles illustrating barometric grid spacing in accordance with the present invention on standard days (ISA conditions) and non-standard days (deviation from ISA conditions) respectively. FIGS. 11 and 12 illustrate the grid spacing on a display based on the actual lapse rate. The vertical distance between horizontal grid lines in a profile display represents a constant difference in barometric altitude. When the barometric correction technique of the present invention is applied, the difference in barometric altitude between grid lines remains constant, but the difference in geometric altitude between the grid lines changes. Since the terrain position is GPS based, the terrain depiction remains constant. Terrain also always remains in the correct position relative to the ownship symbol. FIGS. 11 and 12 each depict a 1000 feet vertical range selection from a FMS CDU vertical range control (not shown). FIG. 11 depicts a flight profile on a standard day where both the Barometric and GPS Scale grid spacing is set to 1000 feet as shown by arrow 78. In contrast, FIG. 12 depicts a flight profile on a non-standard day where the Barometric Scale grid spacing is set to 1000 feet but the GPS Scale grid spacing is less than 1000 feet as shown by arrow 88.

Thus the present invention may enhance the functionality of a TAWS by improving the accuracy of terrain alerting and the depiction of the relative positions of the ownship position, flight plan, and terrain to each other. The use of temperature compensated altitudes (e.g., from ADC and GPS) is accomplished by computing the difference between TAWS alert altitude (ADC, Temperature Compensated or GPS) and current indicated altitude to determine the coordinate transformation between the barometric and geometric altitude scales. This coordinate transformation is then applied to depict the true position of the aircraft and flight plan relative to terrain on both the profile and 3-D views. The coordinate transformation is also used to depict the barometric altitude scale relative to terrain on the profile view maintaining an accurate depiction of separation between ownship position and terrain. The present invention also can be used to adjust the Flight plan advisory function of the aircraft so that when the aircraft is in flight it can use the corrected waypoint altitudes obtained by applying the transformation to generate advisories.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of compensating for an incorrect measurement of altitude of an aircraft comprising:
   displaying a flight plan of an aircraft consistent with vertical constraints from a flight management system (FMS);
   displaying an ownship position of the aircraft consistent with an incorrect measurement of altitude of the aircraft;
   displaying the ownship position in reference to the flight plan consistent with vertical deviation from a primary flight display (PFD); and
   compensating for incorrect measurement of altitude by displaying aircraft terrain on a scale consistent with actual barometric altitude thereby accurately displaying ownship position and flight plan in reference to a terrain.

2. The method of claim 1 wherein the incorrect measurement of altitude is caused in part by an inaccurate altimeter setting.

3. The method of claim 1 wherein the incorrect measurement of altitude is caused in part by an inaccurate altimeter sensor including a barometric altimeter or an air data computer (ADC).

4. The method of claim 1 wherein the incorrect measurement of altitude is caused in part by non-standard atmospheric conditions including deviations from international standard atmospheric conditions (ISA).

5. The method of claim 1 wherein compensating comprises:
   obtaining a first altitude, static air temperature and a standard atmosphere temperature at the first altitude;
   computing a first factor based on the difference between the static air temperature and the standard atmosphere temperature;
   computing a second factor based on the natural logarithm of the ratio of the standard atmosphere temperature to sea level temperature;
   computing a third factor based on the product of the first factor and the second factor; and computing a temperature compensated altitude based on the difference between the first altitude and the third factor.

6. The method of claim 5 wherein the first altitude is obtained from a barometric altimeter or an air data computer (ADC).

7. The method of claim 5 wherein the temperature compensated altitude is applied when predetermined criteria occur including when the first altitude is less than 3600 feet, when atmospheric conditions are below international standard atmospheric (ISA) conditions, and when the temperature compensated altitude is lower than the first altitude.

8. The method of claim 5 wherein the temperature compensated altitude is applied when an aircraft is cruising enroute between two terminals.

9. The method of claim 1 wherein compensating comprises maintaining constant the difference in barometric altitude between horizontal grid lines in a profile display but adjusting the difference in geometric altitude between the grid lines.

10. The method of claim 1 further comprising generating advisories on a flight plan advisory function of an aircraft using the compensated altitudes.

11. A method of compensating for non-standard atmospheric conditions of an aircraft comprising:
    displaying a flight plan of an aircraft consistent with vertical constraints from a flight management system (FMS);
    displaying an ownship position of the aircraft consistent with vertical deviation from a primary flight display (PFD); and
    compensating for non-standard atmospheric conditions by displaying aircraft terrain on a scale consistent with actual barometric altitude thereby accurately displaying ownship position and flight plan in reference to a terrain.

12. The method of claim 11 wherein compensating comprises:
    comparing GPS altitude datum with mean sea level (MSL), and if equal, then setting current GPS altitude to GPS altitude based on the MSL; and
    comparing GPS altitude datum to World Geodetic System 1984 (WGS84), and if equal, then setting current GPS altitude to the difference between the altitude based on WGS84 and an ellipsoid correction factor.

13. The method of claim 11 wherein compensating is performed at least every 100 milliseconds.

14. The method of claim 11 wherein compensating is performed when GPS vertical dilution of precision (VDOP) limits is less than 4.0 and when air data computer (ADC) altitude is above or below GPS altitude +/−2.5σ limits.

15. The method of claim 11 wherein non-standard atmospheric conditions include deviations from international standard atmospheric conditions (ISA).

* * * * *

UNITED STATES PATENT AND TRADEMARK OFFICE
CERTIFICATE OF CORRECTION

| | | |
|---|---|---|
| PATENT NO. | : 7,599,766 B2 | Page 1 of 1 |
| APPLICATION NO. | : 11/221716 | |
| DATED | : October 6, 2009 | |
| INVENTOR(S) | : Ardila et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this

Twenty-eighth Day of September, 2010

David J. Kappos
*Director of the United States Patent and Trademark Office*